United States Patent [19]

Lempicke

[11] Patent Number: 5,451,963
[45] Date of Patent: Sep. 19, 1995

[54] METHOD AND APPARATUS FOR DETERMINING AIRCRAFT BANK ANGLE BASED ON SATELLITE NAVIGATIONAL SIGNALS

[76] Inventor: Thomas A. Lempicke, 2129 Squire Rd., Rock Hill, S.C. 29730

[21] Appl. No.: 249,803

[22] Filed: May 26, 1994

[51] Int. Cl.6 .......................... H04B 7/185; G01S 5/02
[52] U.S. Cl. ..................................................... 342/357
[58] Field of Search ................ 342/357; 364/434, 441, 364/447

[56] References Cited

U.S. PATENT DOCUMENTS

| | | | |
|---|---|---|---|
| 4,825,194 | 4/1989 | Rasinski | 340/975 |
| 4,835,537 | 5/1989 | Manion . | |
| 4,866,450 | 9/1989 | Chisholm . | |
| 4,881,080 | 11/1989 | Jablonski . | |
| 5,195,039 | 3/1993 | Gold et al. . | |
| 5,216,611 | 6/1993 | McElreath . | |
| 5,228,854 | 7/1993 | Eldridge . | |

Primary Examiner—Theodore M. Blum
Attorney, Agent, or Firm—Shefte, Pinckney & Sawyer

[57] ABSTRACT

An apparatus for determining the bank angle of a moving aircraft includes a receiver for receiving navigational signals from NAVSTAR/GPS satellites in orbit about the earth, a signal processor for demodulating the satellite navigational signals, an arrangement for determining aircraft speed based on the navigational signals, an arrangement for determining the rate of change of the aircraft track heading from the navigational signals, an arrangement for determining the bank angle of the moving aircraft from the aircraft speed and the rate of change of track heading wherein the aircraft bank angle is inversely proportional to the aircraft speed and directly proportional to the rate of change of track heading.

14 Claims, 5 Drawing Sheets

METHOD AND APPARATUS FOR DETERMINING AIRCRAFT BANK ANGLE BASED ON SATELLITE NAVIGATIONAL SIGNALS

BACKGROUND OF THE INVENTION

The present invention relates broadly to aircraft instrumentation and, more particularly, to an apparatus for determining and displaying the bank angle of a moving aircraft based on satellite navigational signals.

An aircraft turns by banking which is caused by oppositely deflecting ailerons. As the aircraft turns in a banking manner, the pilot requires some visual indicator of the aircraft banking attitude to coordinate the turn, maintain the desired course and to safely operate the aircraft. The banking attitude is the aircraft bank angle or angle of bank. Bank angle indicators are common instrumentation in an aircraft and are sometimes combined with a bubble/level device to form a combined instrument known as a turn coordinator. The display associated with this device gives the pilot necessary information regarding performance of a coordinated turn. As the aircraft turns, winds can cause lateral forces to affect the aircraft turning movement, tending to slip the aircraft sideways. The rudder may be moved in correcting response to lateral forces causing the aircraft to slip. The lateral forces are displayed on the turn coordinator using the bubble-type device similar to a carpenter's level. However, it is the bank angle which actually defines the extent and rate of the turn in coordination with aircraft speed. Current bank angle indicators or turn coordinators are based on gyroscopes and use the precession of the gyroscope in combination with a correction factor to determine bank angle. The bank angle is displayed on the turn coordinator using a tilting aircraft silhouette.

Currently, satellite guidance has become widely used for navigation and promises to be a significant advance in air navigation. The current system known as NAVSTAR or global positioning system (GPS) provides complete navigational guidance anywhere in the world, twenty-four hours a day, and is highly accurate. The system was originally developed for military use and, accordingly, reports at two levels of accuracy. The first is the precision mode for military use which is accurate to within 16 meters laterally and vertically and the coarse/acquisition mode for civilian use provides three-dimensional position accurate to within 100 meters. NAVSTAR/GPS functions virtually free of all environmental limitations providing reliability at all times of the day or night, during all seasons, in all weather conditions, and free of solar disturbances. Further, NAVSTAR/GPS offers a relatively inexpensive system from the user's point of view. While the satellites themselves are enormously expensive, the satellite navigation units are well within reach of those with such a need. The navigation receiver units may be mounted with an aircraft, other vehicles, or with hand-held, computer-coordinated displays. Further, the NAVSTAR/GPS is a passive system not requiring interrogation by the user.

NAVSTAR/GPS provides twenty-four satellites in synchronous orbit about the earth. Each satellite contains four atomic clocks so that their time and position is precisely known. Therefore, a conventional triangulation fix is possible and the time of the fix is also known. One of the inherent problems is that, while the satellites can carry four atomic clocks, the ground units typically use a quartz oscillator so that the timing on the receiving end is somewhat inaccurate. To compensate for this, a navigation signal is obtained using four satellites with the fourth satellite providing a time correction. The NAVSTAR/GPS navigational signals may be used for determining a precise location above the earth or on the earth to determine longitude, latitude and altitude. As may be expected, given the known position information and an accurate clock, derivative information may be obtained from the navigational signals and applied in various ways.

SUMMARY OF THE INVENTION

It is accordingly an object of the present invention to use derivative information from the NAVSTAR/GPS satellite system to provide an accurate and reliable indication of aircraft bank angle. It is a further object of the present invention to provide a display unit for displaying the NAVSTAR/GPS derived bank angle in an aircraft control panel instrument. It is another object of the present invention to provide accurate aircraft bank angle information displayed in a hand-held instrument, which may be a dedicated instrument for providing only aircraft bank angle or may be incorporated into any of the commercially available GPS navigational receivers.

To that end, an apparatus for determining the bank angle of the moving aircraft includes a receiver for receiving navigational signals from satellites in orbit around the earth and a signal processor for demodulating the satellite navigational signals. Further, the present invention includes an arrangement for determining aircraft speed based on the navigational signals, an arrangement for determining the rate of change of the aircraft track heading from the navigational signals and an arrangement for determining the bank angle of the aircraft from the aircraft speed and the rate of change in track heading wherein the bank heading is inversely proportional to the aircraft speed and directly proportional to the change rate of track heading. Preferably, the speed determining arrangement, the heading change rate determining arrangement and the bank angle determining arrangement are preprogrammed microprocessors receiving input from the signal processor. It is preferred that the receiver include at least one antenna for receiving positional signals from the satellites.

The present invention preferably further includes a device for displaying the bank angle determined by the bank angle determination arrangement. Further, the apparatus preferably includes a display arrangement including a housing configured to mount the device in an aircraft control panel. Additionally, the present invention may include a portable, hand-held housing. The receiver and signal processor may also be disposed in a preexisting, hand-held, commercially available satellite navigational receiver having a housing and a display screen and the speed determination arrangement the heading change rate determining arrangement and the bank angle determining arrangement are disposed within the housing and are operatively connected to the receiver, the signal processor and display screen for using the hand-held receiver in a moving aircraft to display the bank angle thereof.

Optionally, the aircraft may be equipped with an automatic piloting system and the bank angle determination arrangement is operatively connected thereto to apply the determined bank angle to the automatic piloting system.

Preferably, the signal processor includes an arrangement to define a first aircraft position and a second aircraft position different from the first aircraft position and the arrangement for determining aircraft speed includes an arrangement for calculating aircraft speed based on the distance between the first aircraft position and the second aircraft position and the time of traversal of that distance.

The signal processor of the apparatus may include an arrangement for determining the Doppler shift in satellite carrier frequency and the arrangement for determining aircraft speed may include a microprocessor preprogrammed with information to include the fixed velocity of the satellites and an arrangement to relate the Doppler shift of the satellite carrier frequency with the satellite velocity to determine an effective Doppler shift in satellite carrier frequency which is proportional to aircraft speed.

It is preferred that the navigation signals include a clock signal and the arrangement for determining the rate of change of the aircraft track heading includes an arrangement for predicting the straight line displacement of the aircraft after a predetermined time period based on the aircraft heading and an arrangement for determining the actual displacement of the aircraft after the predetermined time period and an arrangement for determining the deviation of actual displacement from predicted displacement per unit time as measured by the clock signal, thereby determining the rate of change of the aircraft track heading.

A method for determining the bank angle of the moving aircraft is also disclosed and comprises the steps of receiving navigational signals from satellites in orbit around the earth, processing the navigational signals, determining the aircraft speed based on the processed signals, determining the rate of change of the aircraft track heading from the navigational signals, determining the bank angle of the aircraft from the aircraft speed and rate of change of aircraft track heading and displaying the aircraft bank angle in a pilot readable manner. Preferably, the method of determining aircraft bank angle includes determining the bank angle as being inversely proportional to the aircraft speed and directly proportional to the rate of change of track heading.

By the above, the present invention provides an accurate, reliable instrument for displaying the bank angle of a moving aircraft to thereby aid the pilot in turn coordination. The present invention is usable under all weather conditions, at all times, and is not affected by solar conditions.

DETAILED DESCRIPTION OF THE PREFERRED EMBODIMENT

Figure 1:
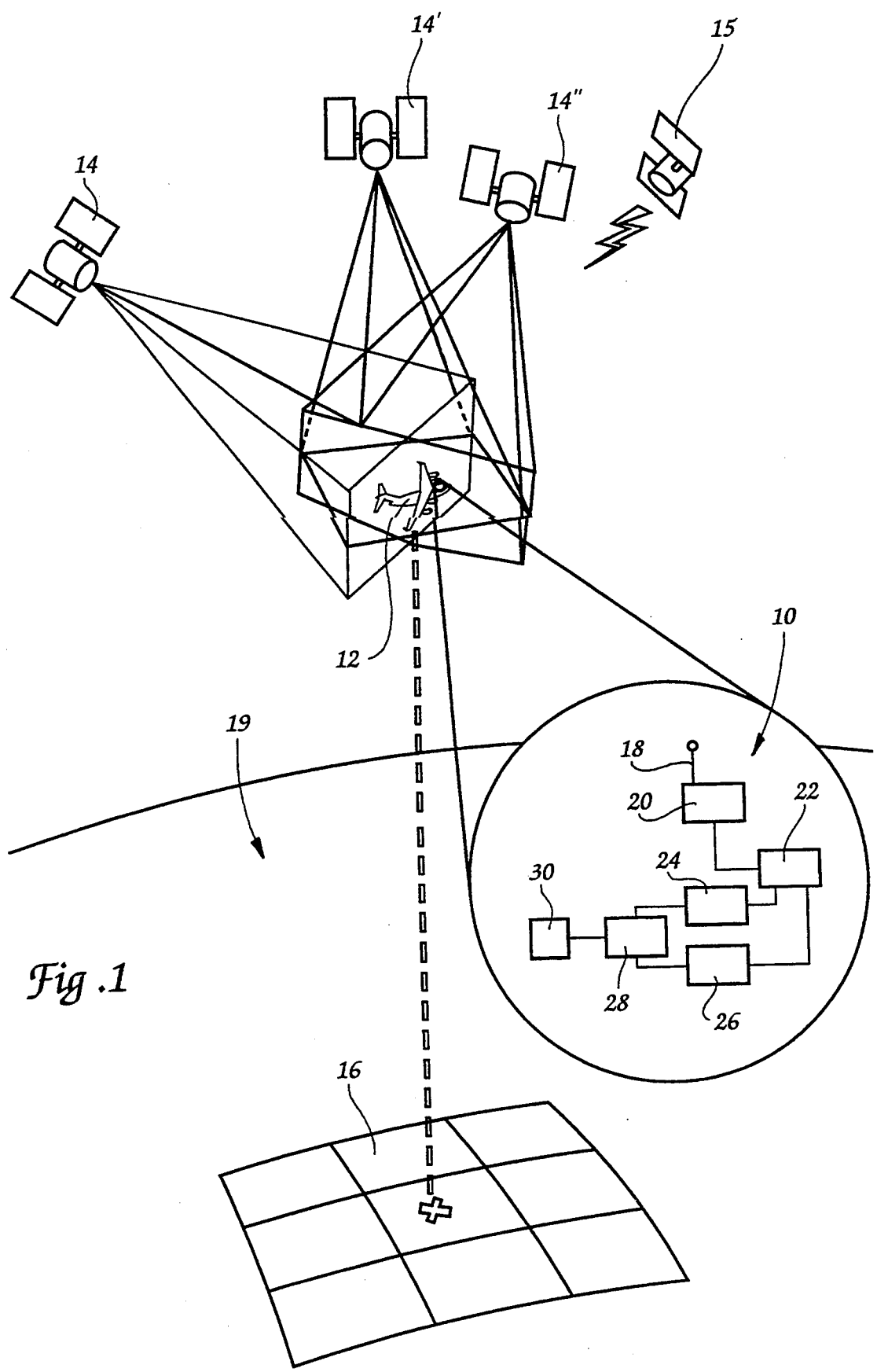
FIG. 1 is a diagrammatic view of an aircraft equipped with the preferred embodiment of the present invention illustrating the manner in which the satellites are used to determine aircraft position and illustrating a block diagram of the present invention using the satellite information.

Looking now at the accompanying drawings at initially at FIG. 1, an apparatus for determining the bank angle of a moving aircraft is diagrammatically illustrated at 10 and includes an antenna 18 which is connected to a receiver 20 which is in turn connected to a signal processor 22. The signal processor 22 is a conventional demodulation unit which receives the satellite carrier signals from the receiver 20 to separate the information bearing signals from the carrier signal. The signal processor 22 also compares the time-based signal replies from all of the satellites to arrive at latitude and longitudinal information. The output of the signal processor 22 is typically a squarewave pulse carrying information regarding the latitude and longitude of the receiver 20. It is contemplated that the actual signal may be any one of several various forms, i.e., sinusoidal, sawtooth, or the like. The important factor is that the signal carry latitude and longitude information. The signal processor 22 is operatively connected to an aircraft speed determination circuit 24 and a circuit 26 for determining the rate of change of the aircraft track heading. These two circuits 24,26 are operatively connected to a bank angle determination circuit 28 for determining the bank angle of the moving aircraft based on signals emitted from the speed determination circuit 24 and the track heading change rate determination circuit 26. Finally, a display 30 is operatively connected to the bank angle determination circuit 28 for displaying the aircraft. Operation of the circuits will be explained in greater detail hereinafter. However, it should be noted that, while the circuits utilized with the present invention are presented in the present application in block diagram form, the electronics to carry out the various functions are well known and their arrangement is well within the skill of those versed in the art of avionics.

As can be seen in FIG. 1, the apparatus 10 of the present invention is mounted in an aircraft 12 and communicates with the NAVSTAR/GPS satellites 14,14',14",15 to acquire the necessary navigational signals. As is well known, electronic signals emitted from a point emanate from that point spherically. If an object, such as an aircraft, encounters the electronic signal, its distance to the signal source may be determined. However, its position may be anywhere on a sphere surrounding the electronic signal at the given distance. This is illustrated by the sphere section projection associated with the first NAVSTAR/GPS satellite 14 in FIG. 1. If a second satellite 14'is provided, a second distance becomes known so that the aircraft may be located anywhere along the intersection of the two spheres resulting from the two satellites 14,14'. If a third satellite 14" is added, the distance to the third satellite from the aircraft may be known and the intersection of all three spheres provides two possible solutions for position. One possible solution will be negative or otherwise unacceptable and the exact position of the aircraft may be determined by the remaining position. This technique is known commonly as triangulation. With twenty-four orbiting NAVSTAR/GPS satellites, an aircraft position anywhere on the globe may be instantaneously determined. Since the NAVSTAR/GPS satellites include atomic clocks and since the terrestrial receivers typically include a quartz clock which could ruin the accuracy advantage provided by the atomic clocks, a fourth satellite 15 is provided to act as the receiver's atomic clock. Using the above information, a conventional NAVSTAR/GPS receiver can determine a position according to latitude and longitude on imaginary grid 16 on the surface of the earth 19. Thereby, the aircraft position can be determined at all times.

A single antenna 18 is provided for the receiver 20. Since all of the calculations performed by the present invention are relative to the changing positional information of the antenna 18, absolute position with respect to latitude and longitude as shown on the grid 16 in FIG. 1 is not a fundamental requirement. Accordingly, the resolution limitations inherent with civilian NAVSTAR/GPS signals is not limiting. The accuracy of the instrument is thus determined by the sampling rate of the receiver which can be controlled. Accordingly, the more rapidly the receiver samples satellite signals, the more accurate the relative positional information becomes.

Initially, the antenna 18 receives the NAVSTAR/GPS navigational signals which are coupled to the receiver 20. The receiver 20 then sends the signals to the signal processor 22 for demodulation. Once the signals are demodulated, preprogrammed microprocessors are called upon to determine the aircraft speed and the rate of change of track heading.

To determine the aircraft speed, either of two techniques may be employed. Initially, speed may be determined directly by determining a first position, a second position, and the time it takes for the aircraft to traverse the distance between the two. All of these values may be calculated from the information acquired from the satellite. A second method for determining the speed of the aircraft is to use the Doppler shift in the frequency of the satellite transmission. The satellite essentially "knows" its position and speed so that any shift in frequency transmitted by the satellite is due to the speed of the aircraft. Conventional circuitry can be applied to determine this speed.

Figure 2:
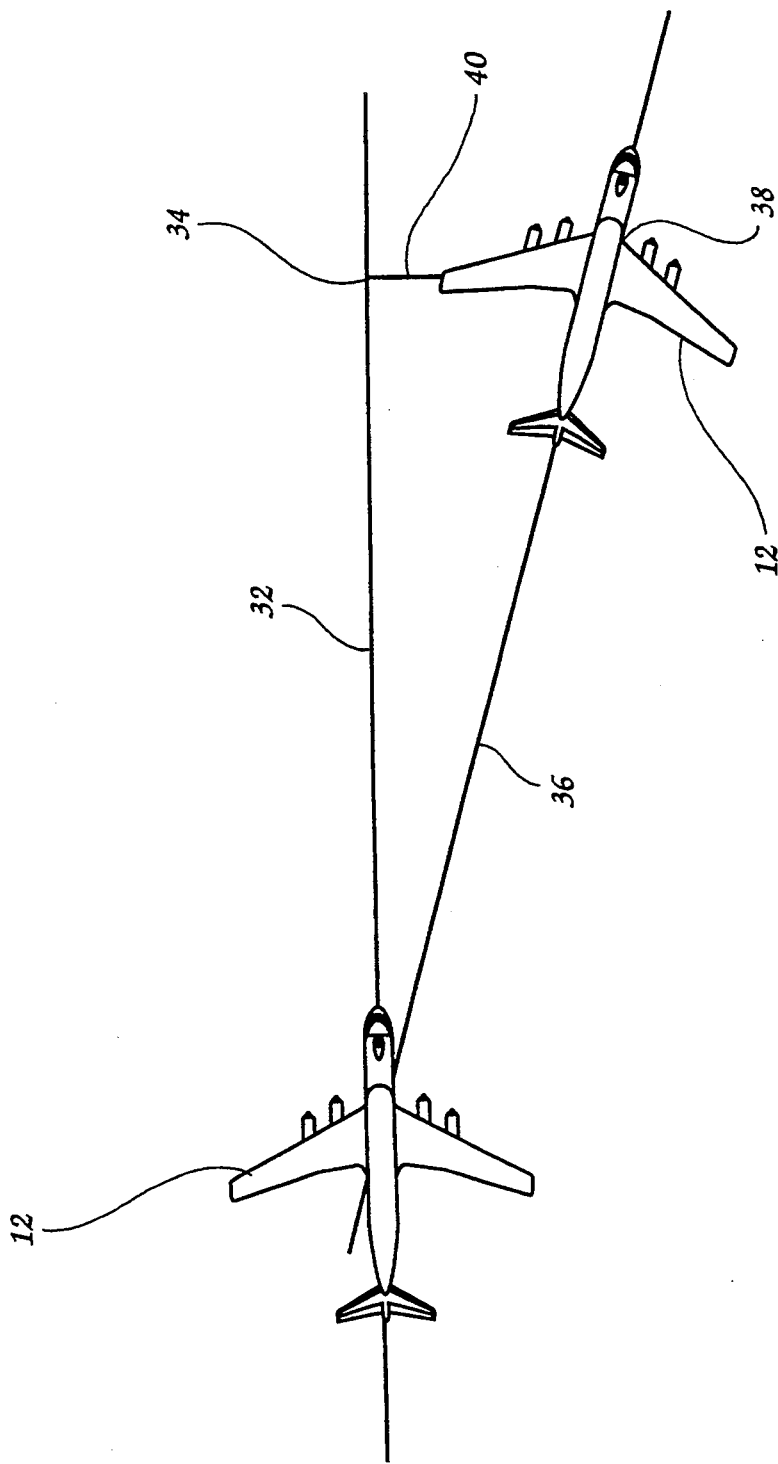
FIG. 2 is a diagrammatic view illustrating the change of aircraft track heading.

With reference to FIG. 2, a turning aircraft 12 is illustrated on a projected track heading 32. As it turns, the aircraft is heading on an actual track 36 on vector, which is constantly changing. Microprocessors within the circuitry of the present invention determine the projected position 34 of the aircraft after a predetermined time period on its projected track 32 at its current speed. The actual position 38 of the aircraft is determined by the NAVSTAR/GPS receiver system and the difference between the actual position 38 and projected position 34 provides a deviation 40 from the projected track heading 32. Clock signals are used in conjunction with the change in track heading to determine the rate of change of the deviation from track heading and this information is directly proportional to the bank angle of the aircraft. Accordingly, as bank angle increases the rate of change of track heading increases.

The signal emitted by the circuit for determining the rate of change of track heading is combined with the aircraft speed in a summation circuit 28 which calculates the bank angle of the aircraft as being inversely proportional to the speed of the aircraft and directly proportional to the rate of change of track heading of the aircraft. This information is then displayed on a display unit 30 in a pilot readable manner. In addition, this information can be used by an aircraft autopilot system for turn guidance.

Figure 3:
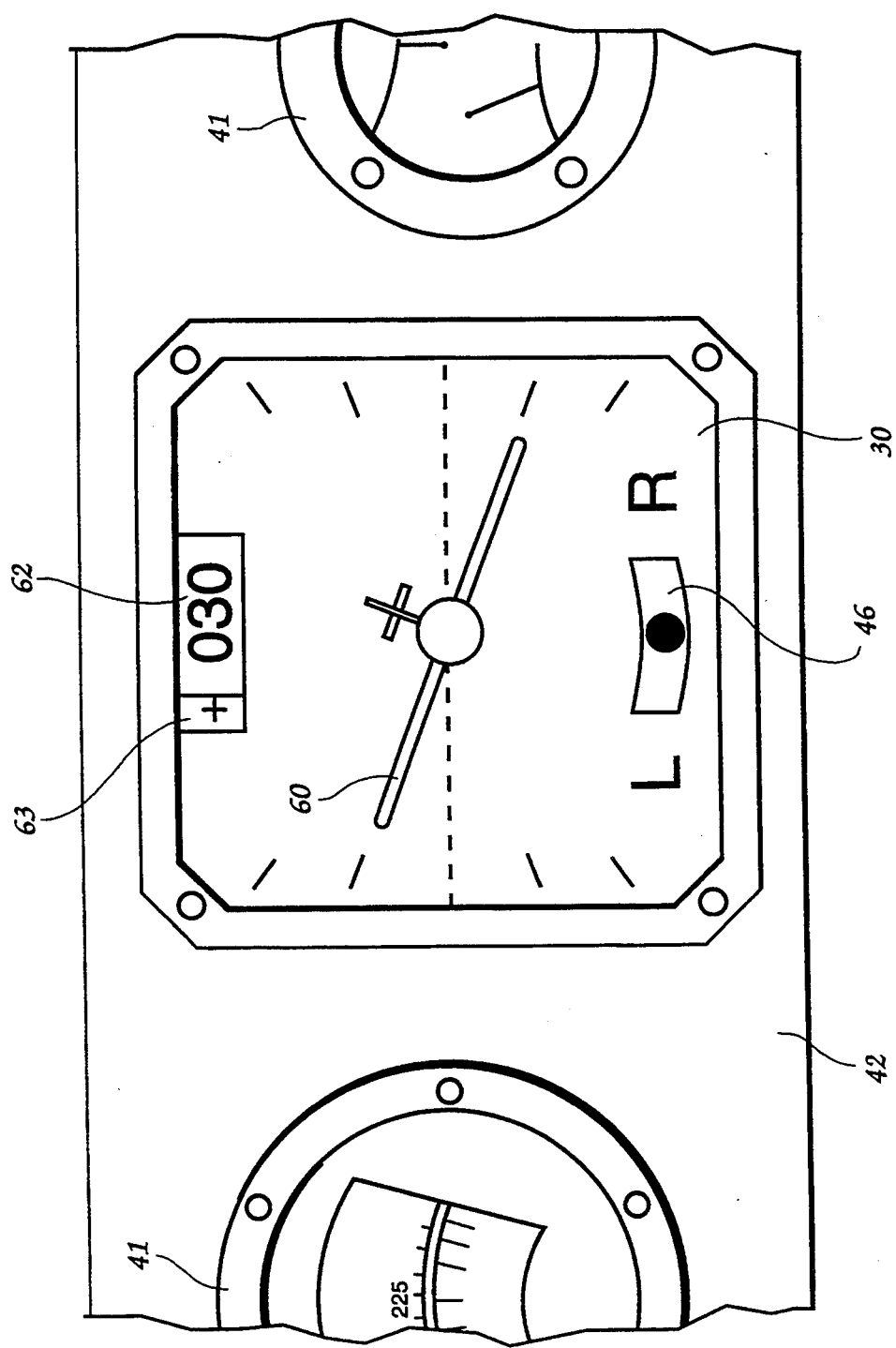
FIG. 3 is a front view of an aircraft instrument displaying bank angle according to the present invention in a control panel setting.

The display 30 may take a number of forms. Preferably, the display is included in the control panel 42 of an aircraft as best seen in FIG. 3. The illustration in FIG. 3 discloses the bank angle display 30 as an electronic display unit in an aircraft control panel 42 housing other instruments 41. The display 30 includes an aircraft silhouette 60 providing a graphical indication of the aircraft in a banking turn and a digital display 62 to provide a digital readout of the actual bank angle. A supplementary indicator 63 is provided to provide a "positive" indication for an increasing change in track heading and a "negative" indication for a decreasing change in track heading. Preferably, the display 30 is in the form of a liquid crystal diode. The display 30 can be combined with a bubble indicator 46 which indicates the lateral forces acting on the aircraft and is an indication of slip requiring sudden manipulation for correction. The combined bank angle display 30 and bubble display 46 provide a coordinated turn indicator in an aircraft instrument panel setting.

Figure 4:
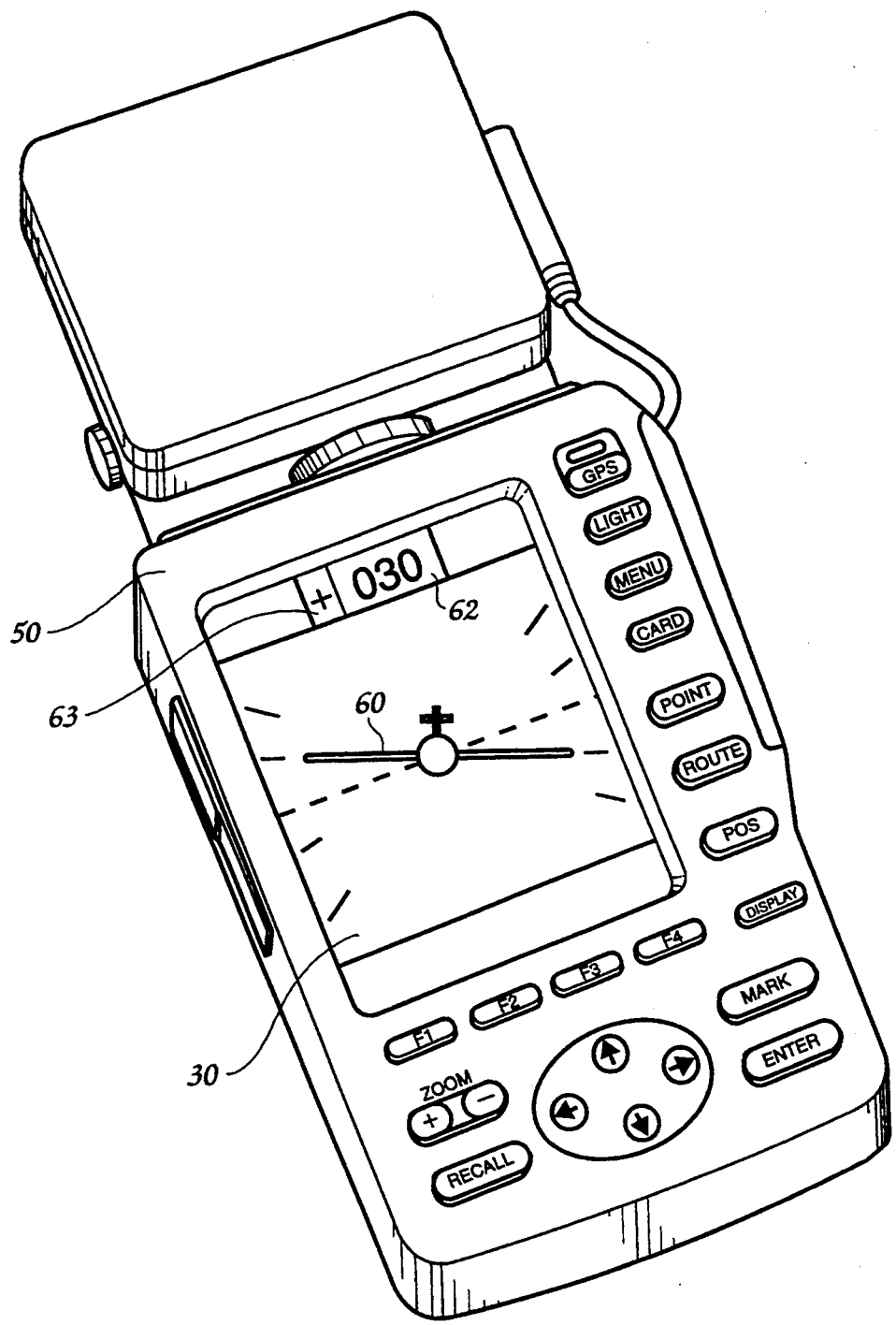
FIG. 4 is a perspective view of a hand-held commercial NAVSTAR/GPS receiver displaying aircraft bank angle.

Turning now to FIG. 4, a commercially available NAVSTAR/ GPS receiver 50 is depicted. The configuration shown is available from Sony as a PYXIS IPS-760 hand-held receiver and is available from Sony, One Sony Drive, Park Ridge, New Jersey 07656. The receiver 50 conventionally provides a graphic display of latitude and longitude and may include map information. The unit is battery powered and includes a slot (not shown) for memory cards. It is contemplated by the present invention that the aircraft bank angle display 30 may be incorporated into the hand-held NAVSTAR/GPS receiver 50 to provide a hand-held display for aircraft which are otherwise not equipped with the conventional instrument panel display.

Figure 5:
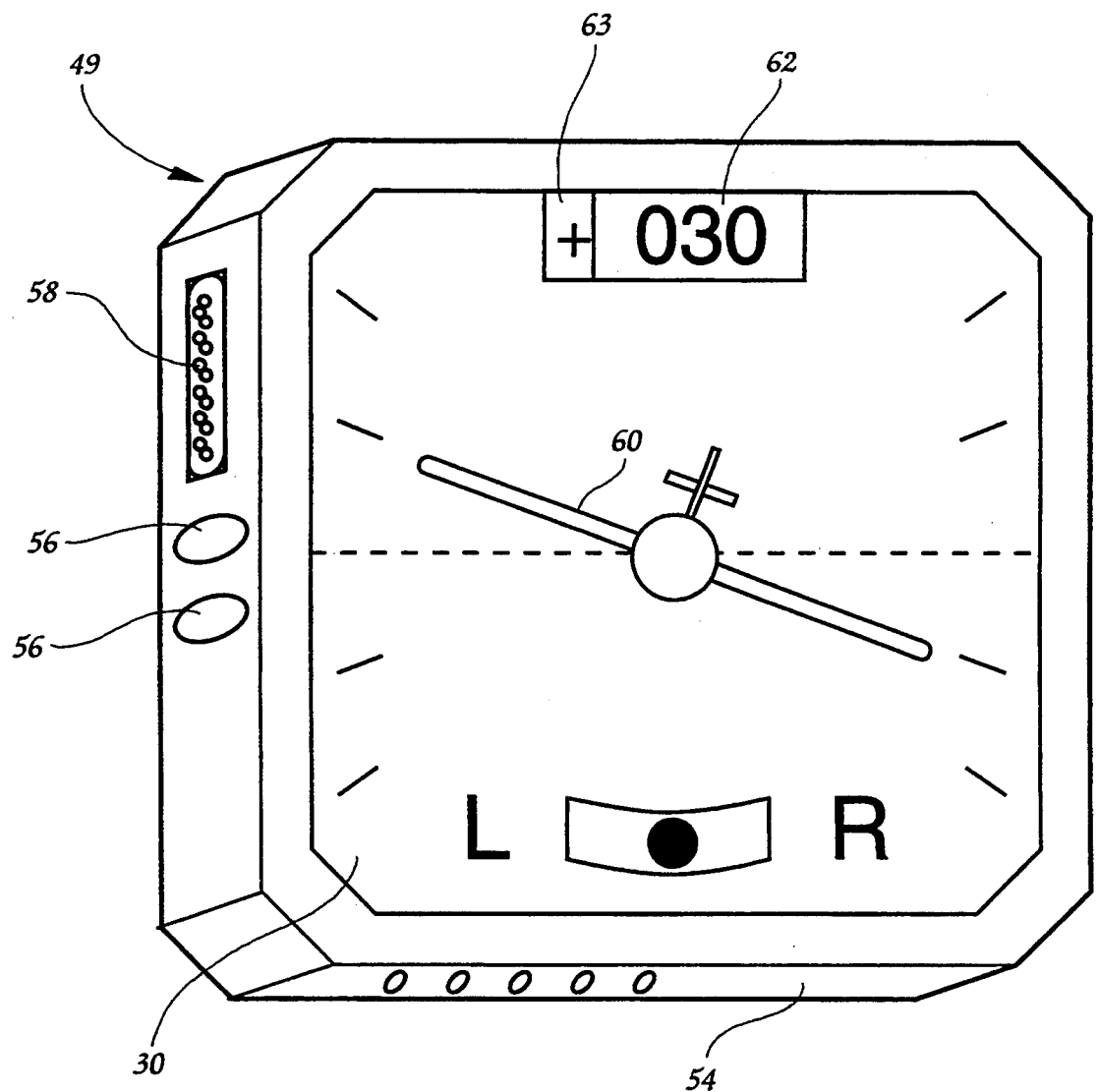
FIG. 5 is a perspective view of a hand-held device for displaying aircraft bank angle.

As a further option, FIG. 5 illustrates a hand-held aircraft bank angle display unit 49 including a housing 54, control switches 56 and an input-output connector 58. This hand-held unit provides a display 30 which is similar to the display 30 incorporated for the control panel unit. This unit 49 will require associated cabling to utilize signals from the bank angle determination circuit within the aircraft's avionics system according to the present invention, and as previously described.

By the above, the present invention provides a simple, accurate and reliable instrument for determining and displaying the bank angle of a moving aircraft and thereby providing the pilot with accurate directional information for enhanced flight safety.

It will therefore be readily understood by those persons skilled in the art that the present invention is susceptible of a broad utility and application. Many embodiments and adaptations of the present invention other than those herein described, as well as many variations, modifications and equivalent arrangements will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the claims appended hereto and the equivalents thereof.

I claim:

1. An apparatus for determining the bank angle of a moving aircraft comprising:
   receiver means for receiving navigational signals from satellites in orbit about the earth;
   signal processing means for demodulating the satellite navigational signals;
   means for determining aircraft speed based on said navigational signals;
   means for determining the rate of change of the aircraft track heading from said navigational signals; and
   means for determining the bank angle of the aircraft from said aircraft speed and said rate change in track heading wherein said bank angle is inversely proportional to said aircraft speed and directly proportional to said rate of change in track heading.

2. An apparatus for determining the bank angle of a moving aircraft according to claim 1 wherein said receiver means includes at least one antenna for receiving positional signals from said satellites.

3. An apparatus for determining the bank angle of a moving aircraft according to claim 1 wherein said speed determining means, said beading change rate determining means and said bank angle determining means are preprogrammed microprocessors receiving input from said signal processing means.

4. An apparatus for determining the bank angle of a moving aircraft according to claim 3 and further comprising means for displaying said bank angle determined by said determining means in a pilot readable manner.

5. An apparatus for determining the bank angle of a moving aircraft according to claim 4 wherein said display means includes housing means configured to mount said device in an aircraft control panel.

6. An apparatus for determining the bank angle of a moving aircraft according to claim 4 wherein said display means includes a portable, hand held housing.

7. An apparatus for determining the bank angle of a moving aircraft according to claim 3 wherein the aircraft includes an automatic piloting system and said bank angle determining means is operatively connected to the automatic piloting system includes means for operationally applying the determined bank angle to the automatic piloting system.

8. An apparatus for determining the bank angle of a moving aircraft according to claim 1 wherein said receiver means and said signal processing means are disposed in a preexisting, hand held, commercially available satellite navigational receiver having a housing and a display screen, and said speed determining means, said heading change rate determining means and bank angle determining means are disposed within said housing and are operatively connected to said receiver means, signal processing means and display screen for using said hand held receiver in a moving aircraft to display the bank angle thereof.

9. An apparatus for determining the bank angle of a moving aircraft according to claim 8 wherein said speed determining means, said heading change rate determining means and said bank angle determining means are preprogrammed microprocessors receiving input from said signal processing means.

10. An apparatus for determining the bank angle of a moving aircraft according to claim 1 wherein said navigational signals include a clock signal and said signal processing means includes means to define a first aircraft position and a second aircraft position different from said first aircraft position and said means for determining aircraft speed includes means for calculating aircraft speed based on the distance between said first aircraft position and said second aircraft position and the time of traversal of said distance, said traversal time being determined from said clock signal.

11. An apparatus for determining the bank angle of a moving aircraft according to claim 1 wherein said signal processing means includes means for determining the Doppler shift in satellite carrier frequency and said means for determining aircraft speed includes a microprocessor preprogrammed with information to include the fixed velocity of the satellites and means to relate the Doppler shift of the satellite carrier frequency with the satellite velocity to determine an effective Doppler shift in satellite carrier frequency which is proportional to aircraft speed.

12. An apparatus for determining the bank angle of a moving aircraft according to claim 1 wherein said navigational signals include a clock signal and said means for determining rate of change of aircraft track heading includes means for predicting the straight line displacement of the aircraft after a predetermined time period based .on the aircraft heading and means for determining the actual displacement of the aircraft after said predetermined time period, means for determining the deviation of actual displacement from predicted displacement per unit time as measured by said clock signal thereby determining the rate of change of the aircraft track heading.

13. A method for determining the bank angle of a moving aircraft comprising the steps of:
   receiving navigational signals from satellites in orbit about the earth;
   processing said navigational signals;
   determining aircraft speed based on said processed signals;
   determining the rate of change of the aircraft track heading from said navigational signals;
   determining the bank angle of the aircraft from said aircraft speed and said rate of change of aircraft track heading; and
   displaying the aircraft bank angle in a pilot readable manner.

14. A method for determining the bank angle of a moving aircraft according to claim 13 wherein the step of determining aircraft bank angle includes determining said bank angle as being inversely proportional to said aircraft speed and directly proportional to said rate of change of track heading.

* * * * *